ACCESS MATRIX WITH CHARGE STORAGE DIODE SELECTION SWITCHES

Filed Nov. 1, 1967

INVENTOR
S. G. WAABEN
BY
Charles Scott Phelan
ATTORNEY

ACCESS MATRIX WITH CHARGE STORAGE DIODE SELECTION SWITCHES

Filed Nov. 1, 1967 3 Sheets-Sheet 3

United States Patent Office 3,508,203

Patented Apr. 21, 1970

3,508,203

ACCESS MATRIX WITH CHARGE STORAGE DIODE SELECTION SWITCHES

Sigurd G. Waaben, Princeton, N.J., assignor to Bell Telephone Laboratories, Incorporated, Murray Hill, N.J., a corporation of New York Filed Nov. 1, 1967, Ser. No. 679,817
Int. Cl. H04q 9/00
U.S. Cl. 340—166 13 Claims

ABSTRACT OF THE DISCLOSURE

Charge storage diodes in the selected rails of an access matrix are charged in their forward conducting direction by low current switches which are controlled by matrix address signals. When the matrix current control circuit is activated to supply drive current to the selected crosspoint load of the matrix such current discharges the rail charge storage diodes. Each crosspoint load of the matrix is further connectable to control a circuit of a further matrix. A common current control circuit for the matrix includes plural selectable charge storage diodes with different diode current carrier lifetimes for limiting matrix output current amplitude.

BACKGROUND OF THE INVENTION

Field of the invention

This invention relates to access matrices which employ diodes as selection switches in the rail circuits thereof.

Description of the prior art

In situations where it is necessary to select one circuit from a large group of circuits, access matrices are employed to reduce the number of selection switches required and thereby reduce the cost of the overall selection system. Such a matrix usually has two orthogonally arranged sets of rail circuits which are interconnected at intersections of the circuits in the two sets by crosspoint load circuits. Address signals actuate switches in one rail circuit of each of the two sets and a signal current source supplies current through those switches and their respective rails to the matrix crosspoint circuit defined by the selected rails. Usually a diode in the crosspoint load circuit prevents current flow in sneak paths which include nonselected crosspoint load circuits.

When an access matrix is in operation its rail selection switches in the selected rails carry the full load current which is supplied to the crosspoint load. In semiconductor systems there is for some applications considerable expense involved in providing transistor switches which can perform the rail selection function at the high current levels required. It is, of course, well known in the art that diodes are often used for certain switching applications and that they cost considerably less than transistors because the nature of the diode is such that it conducts substantially more current for a given current path cross-sectional area than does a transistor. However, in selection matrix applications diodes have not heretofore been employed as selection switches because no convenient way has been devised to maintained a reverse bias on diodes of nonselected matrix rails during the time when two rails are selected. Usually the relatively low impedance of the matrix current control circuit and of the selected matrix crosspoint load circuit tend to drain the diode bias supplies.

In all access matrix applications the cost of the rail selection switching hardware is apportioned among the crosspoint load circuits which are connected to that particular rail. When the matrix is employed to drive a magnetic memory, the rail selection switch cost is in turn apportioned among the memory bit locations which can be accessed by a given rail switch. However, certain memory applications require a comparatively small memory; and even though an access matrix reduces the selection switch costs, such cost per memory bit location is still relatively high in the present state of the art.

It is known in the art to employ tandem matrices wherein a pair of primary matrices are employed to select rail circuits of a larger secondary matrix. The tandem arrangement tends to reduce the total number of switches required, and hence the total cost; but it is generally necessary in tandem matrix arrangements to employ some form of transformer or amplifier coupling between the tandem connected matrices. Transformers include coils, and in the present state of the art there is no way to incorporate coils in integrated form in integrated semiconductor circuit systems. In like manner, the use of amplifier coupling between matrices forces one back to the present expensive technique of employing a relatively expensive transistor for each rail of the larger matrix.

It is, therefore, one object of the present invention to reduce the cost of the rail selection switching function in access matrices.

Another object is to facilitate the tandem connection of access matrices.

A further object is to facilitate the incorporation of access matrices into integrated circuit systems.

SUMMARY OF THE INVENTION

The aforementioned objects are realized in an illustrative embodiment of the invention in which asymmetrical conducting devices are used in rail circuits of an access matrix for realizing the rail selection switching function therein. Such devices accumulate current carriers in response to conduction in one direction for charging the devices, and the accumulated carriers are depleted by conduction in the opposite direction. Low current selection circuits respond to matrix selection signals for charging the devices in selected rail circuits of the matrix and those devices are thereafter discharged by the selected crosspoint current when it is applied.

It is one feature of the invention that charge storage diodes are employed for the rail selection switches in an access matrix and are poled for forward conduction of current in a direction which is opposite to the direction of forward current in the selected crosspoint load so that diode charging current does not affect the crosspoint load circuits.

It is another feature that charging current for rail selection diode switches is supplied to corresponding diodes only when the associated rail circuit is to be employed in a matrix operation so that the matrix drive circuits and the diode charging circuits have no direct effects upon one another.

A further feature is that charge storage diodes are charged at one current and voltage level and they can be thereafter discharged at any desired voltage level in a different circuit path.

Still another feature is that the use of charge storage diode rail selection switches permits access matrices to be operated in tandem without requiring intermediate transformers or amplifiers.

BRIEF DESCRIPTION OF THE DRAWING

A more complete understanding of the invention may be obtained from a consideration of the following detailed description when taken together with the appended claims and the attachment drawings in which:

DETAILED DESCRIPTION

Figure 1:
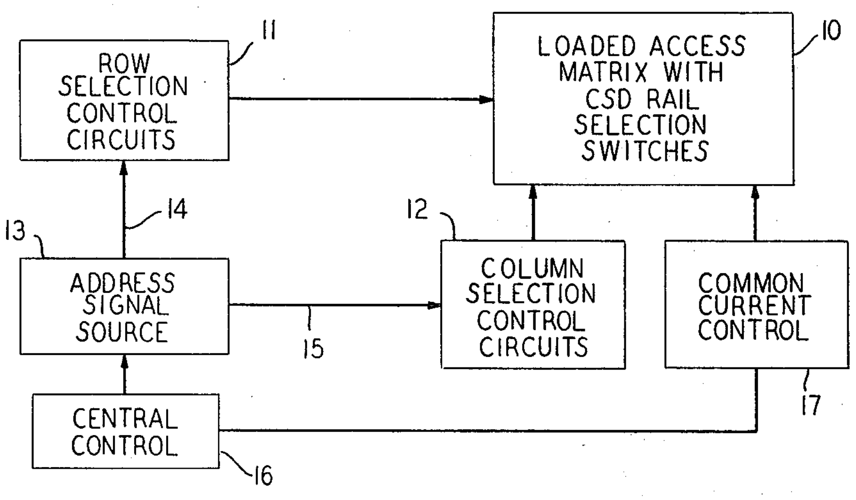
FIG. 1 is a block and line diagram of an access matrix arrangement in accordance with the present invention.

In FIG. 1 a loaded access matrix 10 employs diode rail selection switches which are controlled by row selection control circuits 11 and column selection control circuits 12. Control circuits 11 and 12 are actuated by address signals provided by an address signal source 13 conductors of buses 14 and 15, and those signals define the matrix address of a particular crosspoint load circuit of the matrix 10. A central control circuit 16 for the overall system employing the illustrated matrix arrangement determines the nature of address signals to be provided by the source 13, and it also determines the times of operation of that source 13 and of a common current control circuit 17 which supplies drive current to the selected rail circuits of the matrix 10.

Figure 2A:
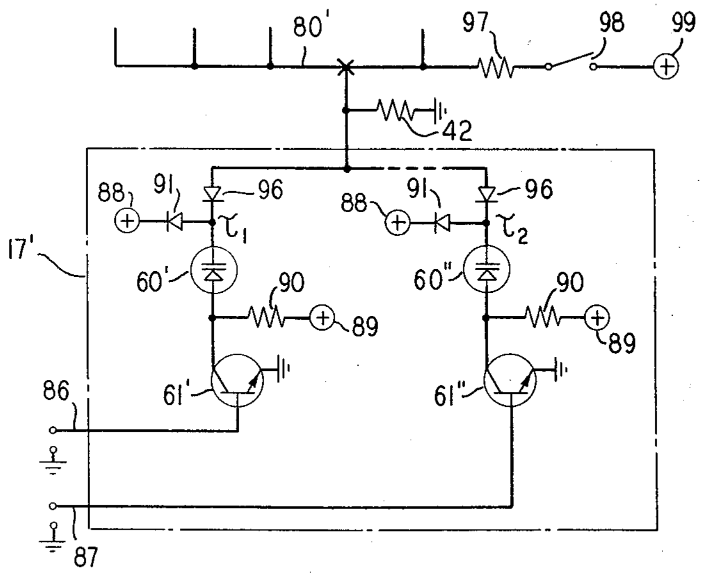
FIG. 2A is a schematic diagram of a modified form of a part of the diagram of FIG. 2.
Figure 2:
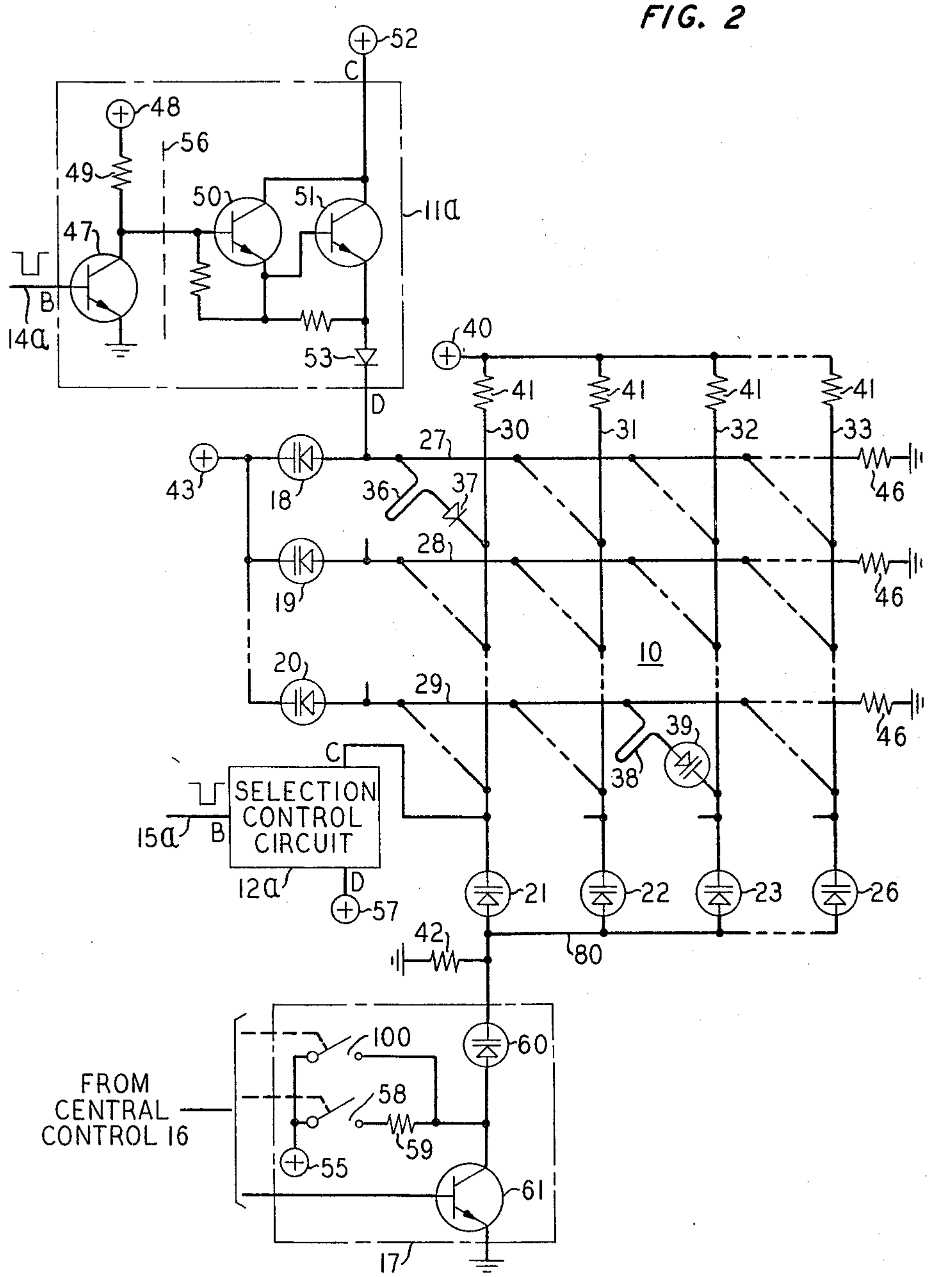
FIG. 2 is a schematic diagram of the access matrix and rail selection control circuits of the arrangement of FIG. 1.

In FIG. 2 the matrix 10 is shown with asymmetrically conducting rail selection switches which are charge storage diodes 18, 19, and 20 in the row rail circuits of the matrix, and 21, 22, 23, and 26 in the column rail circuits of the matrix. Only a relatively few rail circuits need be shown to illustrate the principle of the present invention, but many more than the ones illustrated can be employed. Similarly to preserve the simplicity of the drawing for facilitating an understanding of the invention, only two crosspoint load circuits are shown in the matrix in FIG. 2 and others are schematically represented by diagonal broken lines at the crosspoint load positions. Matrix row rail circuits 27, 28, and 29 are orthogonally arranged, in a drawing sense, with respect to matrix rail column circuits 30, 31, 32, and 33; and at intersections of the respective rail circuits of these two sets of circuits the aforementioned crosspoint load circuits interconnect the respective intersecting rail circuits.

In any one embodiment the crosspoint load circuits are usually, but not necessarily, essentially the same; but different types are shown in FIG. 2 for purposes of illustration. One crosspoint load circuit includes, for example, a magnetic memory drive circuit 36 for a magnetic memory, not shown. The drive circuit 36 is connected in series with a diode 37 between the rail circuit 27 and the column circuit 30. Diode 37 is poled for forward conduction of current from the row rail circuit 27 to the column rail circuit 30. The other one of the two specifically illustrated crosspoint load circuits in FIG. 2 includes another memory drive circuit 38 and a charge storage diode 39, which is also poled for forward conduction from its associated row rail circuit to its associated column rail circuit. The two types of diodes shown in crosspoint load circuits in FIG. 2 represent two of the widely divergent types of circuit operation with which the present invention can be employed.

The rail circuit charge storage diodes of matrix 10 are normally reversely biased in the absence of matrix drive signals provided by common current control circuit 17. The reverse bias for the column rail circuits is provided from a positive potential source 40 which is schematically represented by a circled plus sign. This schematic representation, which is employed throughout the drawings in the present application, represents a source of potential with its positive terminal connected at the circuit point where the circled polarity sign appears and with its terminal of opposite polarity connected to ground. The source 40 is connected through current limiting resistors 41 to the respective column rail circuits of the matrix. The output from source 40 through the column circuits of matrix 10 is returned to ground through a further resistor 42 which is common to all of the column circuits. Resistor 42 provides critical damping resistance for the matrix to suppress ringing in the event that the rail circuit charge storage diodes have sufficiently sharp characteristics to produce such ringing during matrix operation.

Reverse bias for the row rail circuits is supplied from a further positive potential source 43 to each of the row circuits 27, 28, and 29, which are individually returned to ground through resistors 46. The terminal potential of the source 40 is advantageously somewhat larger than that of the source 43 so that the reverse bias arrangements for the rail circuit charge storage diodes also reversely bias the nonselected crosspoint load circuit diodes when a selected crosspoint load circuit is conducting. Inherent stray capacitances around various ones of the circuit elements in FIG. 2 and from the illustrated circuit parts to the surrounding world are not shown, but they are nevertheless present as is well known in the art.

The rail circuit charge storage diodes in FIG. 2 are controlled by the selection control circuits 11 and 12 for the matrix row and column circuits, respectively. Only two such control circuits 11*a* and 12*a* are shown in FIG. 2, but others are schematically indicated by partial connections to corresponding points on the respective row and column circuits of the matrix 10. All selection control circuits which are employed are advantageously similar and details of only one need be described.

In the row selection control circuit 11*a* an address signal in the bus 14 from the address signal source 13 appears on conductor 14*a* in FIG. 2 to select the matrix row rail 27 for operation. This selection signal is a negative-going pulse which biases a normally conducting common emitter connected NPN transistor 47 to a nonconducting state. The positive potential of a collector potential source 48 for transistor 47 is then applied through collector resistor 49 to the base electrode of an NPN transistor 50 which is arranged in a Darlington type of connection with a further NPN transistor 51. The two transistors 50 and 51 respond together as is known in the art and conduct current from a positive source 52 through their respective collector-emitter paths and through a diode 53 to the rail circuit 27.

The source 52 is advantageously of approximately the same potential as the source 40 so that the aforementioned current from the selection control circuit 11*a* flows in the forward direction through charge storage diode 18 and in the reverse direction through source 43 to ground. A vertical broken line 56 is shown in the control circuit 11*a* between the collector electrode of transistor 47 and the base electrode of transistor 50. This line schematically represents the fact that ground for the transistor 47 in all selection control circuits is the same ground employed for address signal source 13 and central control 16, but it is separate from all ground connections directly associated with matrix 10, common current control circuit 17, and transistors 50 and 51. The use of separate grounds improves the isolation of the matrix from the outside world and also improves the matrix balance in situations employing a balanced magnetic store system of the type taught, for example, in the copending application Ser. No. 591,237, filed Nov. 1, 1966, of T. R. Finch and S. G. Waaben.

The specific circuit of FIG. 2 for the rail selection control circuits is one of a number known in the art that are useful for conveniently controlling charging current. A two-stage arrangement as shown permits a small current in transistor 47 to control a much larger current in the Darlington circuit. In some applications, the substitution of a PNP transistor for the circuit of transistors 50 and 51 would permit similar control with a positive input pulse and no standby current requirement. A single-transistor switch could conceivably be used for control circuit 11*a*, but it would leave less speed flexibility because the faster the matrix cycle time that is desired the more current such a transistor must carry to place an adequate charge in the charge storage diode and charge matrix rail stray capacitances. As a single transistor is required to carry more current, its cost approaches the point at which it may just as well be placed directly in the rail circuit.

In further schematic representations of selection control circuits of the same type as the circuit 11*a*, the line B at the side of the schematic representation designates the input point to the base electrode of the transistor 47. A lead C at the top of the representation designates the connection point for the collector electrodes of transistors 50 and 51, and the designation D at the lower part of the representation indicates the connection point for the cathode electrode of the diode 53. A more positive potential must be maintained at the C-lead than at the D-lead to assure proper control circuit conduction conditions for circuit element types and polarities as shown for circuit 11*a*.

At the same time that the control circuit 11*a* is actuated by a negative-going pulse in the manner previously described, the selection control circuit 12*a* is similarly actuated for supplying charging current in the forward direction to the charge storage diode 21 of column circuit 30. The charging path followed by the latter current extends from the control circuit 12*a* through a positive potential source 57, a positive source 55, a switch 58, a resistor 59, and a charge storage diode 60 in common current control circuit 17. Source 55 is necessarily larger than source 57 and source 40. Common current control circuit 17 is of the type shown in the aforementioned Finch et al. application and is schematically represented in greatly simplified form. The switch 58 is closed by signals from the central control 16 in FIG. 1 at the same time that negative-going signals are applied to actuate selection control circuits 11*a* and 12*a*. The resistance of resistor 59 is much smaller than the resistance of any of the resistors 41 so that the aforementioned charging path including control circuit 12*a* constitutes the principal source of charging current for the diodes 21 and 60, but the potential with respect to ground of the column circuit 30 remains positive with respect to the terminal voltage of source 43. This relationship is necessary to maintain a nonconducting state in all crosspoint load circuits associated with column circuit 30 during the charging interval for the charge storage diodes 18, 21, and 60. Similarly the resistance of resistor 42 is significantly larger than the impedance presented to the matrix by the selection control circuit 12*a* and its associated source 57 so that the resistor 42 does not divert substantial charging current from the diode 21.

It will be noted from the foregoing description that the charge storage diodes 18, 21, and 60 are actually charged at different voltage levels. However, the total charge stored in each diode is a function of the integral of the applied current with respect to time, and that charge can be thereafter utilized in other circuits at different voltage levels with no carry over influence from the charging circuit voltage level. It is also noted that in FIG. 2 the described arrangements for the row selection control circuit 11*a* are the same for other row selection control circuits; and, similarly, the described connections for the column selection control circuit 12*a* are the same for other column selection control circuits not specifically shown.

Once the necessary charge storage diodes have been charged in the manner described by the application of forward current thereto, central control 16 removes the actuating signals from the selection control circuits 11*a* and 12*a* and from the switch 58 in current control circuit 17. Almost immediately, however, central control 16 supplies a positive-going signal to the base electrode of a transistor 61 in the circuit 17 and thereby closes a drive current conduction path for the selected crosspoint load circuit of the matrix 10. This conduction path extends from the source 43 through the diode 18 in its reverse conduction direction, column circuit 30, charge storage diode 21, charge storage diode 60, and the collector-emitter path of the NPN transistor 61, to ground. In some applications which from time to time use a relatively small pulse to the crosspoint load circuit, a substantial part of the pulse is supplied by accumulated charge in matrix row rail stray capacitance before the charge storage diode of a selected rail starts to conduct in the reverse direction.

All of the rail circuit charge storage diodes in matrix 10 advantageously have longer minority carrier charge storage lifetimes than the charge storage lifetime of the diode 60. Consequently, upon the discharge of the diode 60 by the depletion of stored current carriers therein, the aforementioned drive current path for the matrix is opened by the high reverse impedance of the diode 60. This occurs because charge storage diodes, although they have the capacity for storing current carriers to contain a charge, are incapable of carrying current of reverse polarity when depleted of charge carriers. Any remanent charge in the rail circuit charge store diodes is at least partially depleted by recombination of carriers. If faster operation is needed than the diode carrier recombination time would permit, switched rail recovery circuits, such as the rail clamp circuits taught in the previously mentioned Finch-Waaben application, are advantageously employed to deplete such remanent carriers.

Although the current carrier lifetime for diode 60 in FIG. 2 is advantageously less than the corresponding lifetime for the rail circuit diodes, there are embodiments in which the diode 60 can have a longer current carrier lifetime. Thus, if the total charge in diode 60 and the minority current carrier lifetime of the diode are such that during the time for driving matrix 10 the diode 60 retains control of drive current amplitude, satisfactory operations will nevertheless result. Thus, for example, if the charge current paths for diode 60 and diode 21 are separate, the diode 60 can be operated satisfactorily with a longer current carrier lifetime by charging the diode with a correspondingly smaller total charge current.

FIG. 2A illustrates a modified common current control circuit 17′ wherein separate charge storage diode charging current paths are provided to limit different drive pulse amplitudes. The charge storage function in the common current control circuit 17′ is adapted to provide different selectable drive pulse amplitudes but also guarantees that some classes of circuit faults could not permit an incorrect drive pulse amplitude to be applied to matrix 10. This modified current control circuit form in FIG. 2A is useful in applications wherein the load on the matrix 10 is a magnetic memory with a nondestructive readout threshold capability requiring different drive pulse amplitudes for nondestructive reading and for writing.

The modified circuit in FIG. 2A is adapted to be substituted for the common current control circuit 17, the associated resistor 42, and a node circuit 80 in FIG. 2. Thus, resistor 42 performs the critical damping function as before. The node circuit 80′ is connected through a limiting resistor 97, and a switch 98, to a positive source 99. Source 99 is of slightly smaller voltage than source 40. It is assumed in FIG. 2A that the load on matrix 10 of FIG. 2 is a magnetic memory requiring drive pulses of different amplitudes and wherein it should be assured that a large amplitude cannot occur dring drive times when the smaller amplitude is supposed to occur. Charge storage diodes 60′ and 60″ in circuit 17′ have current carrier lifetimes $\tau_1$ and $\tau_2$, respectively. Circuit 17″ is operative during read drive in response to read commands on circuit 86 for supplying the smaller of two drive pulse amplitudes to the matrix 10. It responds to write commands on circuit 87 for supplying the larger of the two pulse amplitudes. Both commands are provided by central control 16.

In the common control circuit 17' a source 88 and a source 89, with a larger terminal voltage than the source 88, cooperate to supply charging current to all of the charge storage diodes through individual current limiting resistors 90. Individual steering diodes 91 prevent crosscoupling between charge storage diode circuits through the sources 88 and 89. All of the charge storage diodes continuously receive charging current in the manner described. Their respective current carrier lifetime characteristics limit the maximum charge that can be imposed upon any such diode by any given amplitude of the charging current applied thereto regardless of duration of the charging current. Charge storage diodes can be given different current carrier lifetime characteristics by appropriate manufacturing processes known in the art. Two diode circuit branches are shown in the common current control circuit 17' for illustrating the operation of this aspect of the disclosure, but other diode circuit branches can be readily employed.

Prior to each matrix drive pulse, the selection control circuits charge the matrix rail diodes as before except that during charge time central control 16 closes switch 98 to complete the charge path for the charge storage diode of the selected column rail circuit. During each time interval when a read drive pulse amplitude is to be supplied to the matrix 10, a read command is applied to the circuit 86 for actuating the transistor 61'. The resulting current sweeps the charge storage diode 60' with a reverse current pulse to deplete the accumulated current carriers therein. Each such pulse constitutes a matrix drive current pulse which flows from the matrix through the circuit point 80', one of the steering diodes 96, and the corresponding charge storage diode. After the diode 60' has been discharged, its associated connection to the sources 88 and 89 begins restoring charge therein. In a similar manner a write command on lead 87 actuates transistor 61'' for supplying the larger write pulse to matrix 10.

Certain matrix systems are known in the art which employ charge storage diodes in the crosspoint load circuits for facilitating the application of a bipolar drive current to the crosspoint load. Such a crosspoint load arrangement is illustrated with the diode 39 at the crosspoint load in FIG. 2 which interconnects rail circuit 29 and cloumn circuit 32. To operate this crosspoint load in the bipolar drive mode, the matrix operation is initially essentially the same as has already been described. During the interval when forward crosspoint load circuit current is flowing in the diode 39, that diode is storing minority current carriers in the fashion which is characteristic of charge storage diodes. Upon the termination of the forward current in the diode 39, the central contol 16 turns off transistor 61 and closes a switch 100 for coupling the source 55 directly to diode 60. The resulting current path extends through diodes 60 and 23, diode 39, memory drive circuit 38, row circuit 29, diode 20, and source 43 to ground. This reverse current sweeps the stored charges out of the diode 39, and that diode thereby limits the duration of the reverse current pulse. Further charge is, of course, imposed upon the common diode 60 and the rail diodes 23 and 20 during this operation. However, such further charge is rapidly depleted by carrier recombination before another matrix cycle is begun. Repeated bipolar driving of a selected crosspoint is achieved by appropriate programming of central control 16.

Figure 3:
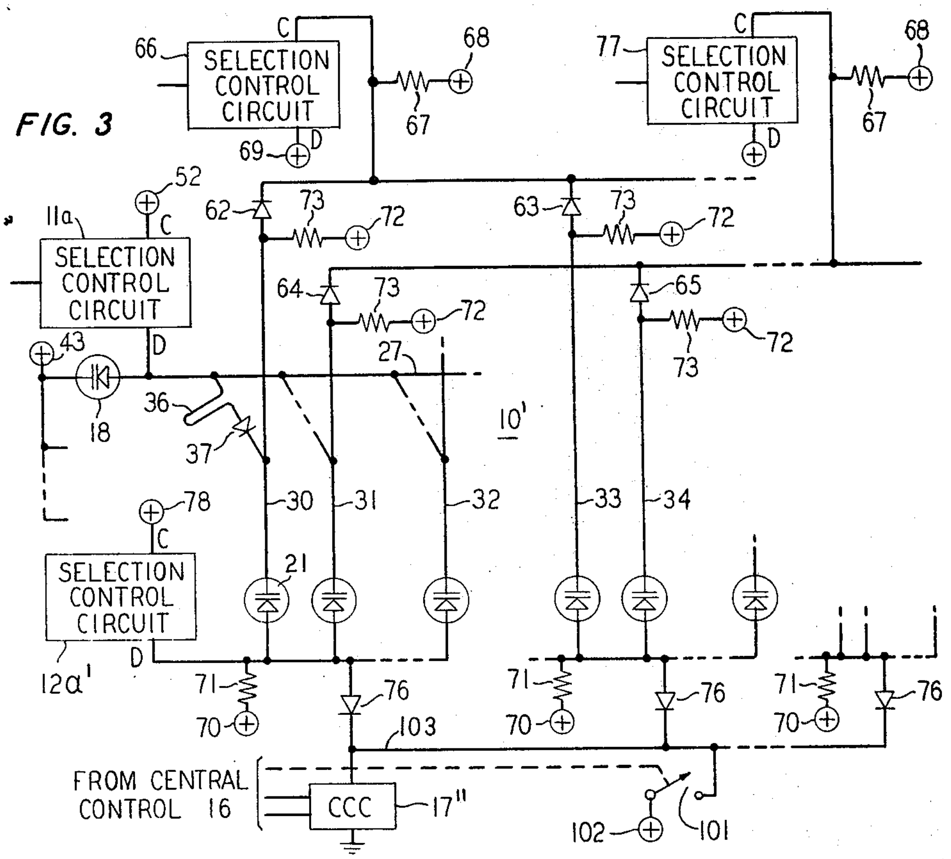
FIG. 3 is a simplified schematic diagram of a modified access matrix arrangement.
Figure 4:
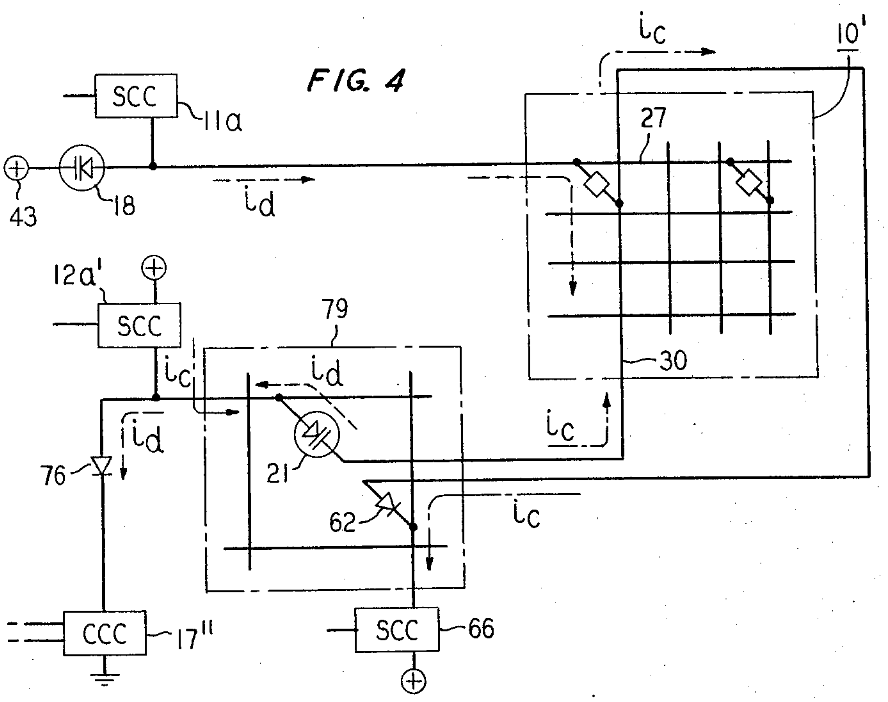
FIG. 4 is a simplified circuit diagram of the access matrix arrangement of FIG. 3 to illustrate an aspect thereof.

The embodiment of the invention which is illustrated in different forms in FIGS. 3 and 4 depicts the manner in which an access matrix with charge storage diodes in the rail circuits may be operated in tandem with another matrix for achieving greater reduction in selection switch costs. At the same time, the tandem matrix circuit arrangement can be readily incorporated into an integrated circuit system. In the FIGS. 3 and 4 circuit elements corresponding to those in other figures of the drawing are designated by the same or similar reference characters. The arrangement for connecting matrices in tandem is shown in terms of a primary matrix for selecting column rails of the tandem matrix 10', but it is to be understood that the same technique is also useful for selecting row rails of the matrix 10'. In FIG. 3 the two matrices are combined for convenience in illustrating the operation of the tandem arrangement, and in FIG. 4 the two martices are separated in a simplified drawing for illustrating the tandem matrix concept.

The column circuits of the matrix 10' in FIG. 3 are assigned to two sets of circuit groups for controlling electrical connections to lower and upper ends, respectively, of those column circuits. The lower end of all column circuits in any one group are controlled by a selection control circuit which is individual to that group. This is illustrated in FIG. 3 wherein column circuits 30, 31, and 32 in a first column circuit group are all controlled at their lower terminals by a selection control circuit 12a'. Other groups of column circuits in the first set groups have their lower terminals individually controlled for their respective groups by additional selection control circuits not specifically shown. Within the respective groups the corresponding selection control circuit provides charging current path closure to the anodes of its charge storage diodes in the column circuits.

The matrix column circuits are differently grouped in a second set of groups for providing electric circuit control at the upper ends thereof. In these different groupings, corresponding column circuits of each of the first set of groups are included together in a common group. Thus, the left-hand cloumn circuit in each of the first set groups, e.g., the column circuits 30 and 33, is connected through a steering diode such as the diodes 62 and 63 to the C-connection of a selection control circuit 66. That same C-connection is further connected through a resistor 67 to a positive source 68. A positive source 69 is coupled to the D-connection of selection control circuit 66 and applies thereto a voltage which is approximately at the same level as the output voltage of the source 43.

Steering diodes 62 and 63 are poled for forward conduction toward the source 68. A source 70 is connected through a resistor 71 to the D-connection of the selection control cirucit 12a' and has a potential which is approximately the same as the potential of source 43. An additional potential source 72 is connected through a resistor 73 to the column circuit 30 at the anode of diode 62. Source 72 has a positive terminal voltage which is approximately the same as that of the source 68. All of the column rail circuits have similar steering diodes and biasing resistors for sources 72. Likewise, all of the first set column rail circuit groups have similar biasing sources 70 and resistors 71, as well as similar group steering diodes 76. Furthermore, all of the second set groupings of the column circuits have similar selection circuit connections as indicated, for example, by a selection circuit 77 which serves all of the column circuits in the first set groups in positions corresponding to positions of the column circuits 31 and 34 in FIG. 3.

In the absence of matrix drive current and of matrix rail selection signals, the sources 68 and the resistors 67 cooperate with the sources 70 and resistors 71 for imposing a reverse bias upon all of the second set steering diodes such as the diodes 62–65 and upon all of the column rail circuit charge storage diodes in the matrix 10'. The sources 72 cooperate in a similar biasing arrangement with sources 70 for reversely biasing the column rail circuit charge storage diodes and for also maintaining the matrix column circuits at a potential which is higher than the potential of the sources 43 and 52' so that steering diodes, e.g., diode 37, in crosspoint load circuits are all reversely biased. A control circuit 17'' is similar to the circuit 17' of FIG. 2A with one or more diode drive paths. The group steering diodes 76 of the first set of groups of the column rail ciruits are reversely biased in the inoperative state of the matrix.

Considering now the operation of the matrix 10', if the crosspoint load circuit including winding 36 and diode 37 is to be selected, the address signals are applied to activate the selection control circuits **11*a*, 12*a'*, and 66. The change storage diode 18 is charged as previously described in connection with FIG. 2. The charge storage diode 21 is charged by current flowing in a path from a source 78 through selection control circuit 12*a'*, diode 21, column circuit 30, diode 62, selection control circuit 66, and source 69, back to ground. None of the other column circuit charge storage diodes which are controlled by selection control circuit 12*a'* is affected by charging current at this time since they have their upper ends connected to selection control circuits of different second set groups. Any charge storage diode in circuit 17''** is charged by the trickle charge method as discussed in regard to FIG. 2A.

At the end of the diode 21 charging time, address signals are removed from the mentioned selection control circuits and central control 16 actuates circuit 17'' to drive matrix 10' as previously described in connection with FIG. 2. Matrix drive current flows in a path extending from the source 43 through row rail 27, winding 36, diode 37, column rail 30, steering diode 76, and the common current control circuit 17'' to ground. This aspect of the operation is essentially the same as previously described in connection with FIG. 2. Since source 43 is a lower potential than is the source 68, the steering diode 62 in column circuit 30 remains reversely biased. A certain amount of additional current will be provided from one of the sources 72 through the column circuit 30, the diode 21, and the diode 76; and some additional current is also provided from the source 70 through the resistor 71 and the diode 76. Resistors 71 and 73 must, therefore, be proportioned with respect to the impedance of the selected crosspoint load and the impedance of the common current control circuit 17'' to minimize the effects of this additional current in order to maintain the desired degree of crosspoint load drive current amplitude control which is to be exercised by common current control circuit 17''.

It can be seen from the foregoing operation that actuation of any given pair of upper and lower column rail selection control circuits produces a selection of a single one of the matrix column circuits. A significant hardware cost saving is realized by this arrangement as can be understood by considering, for example, a matrix with sixty-four column rail circuits. The arrangement of FIG. 2 requires sixty-four selection control circuits such as the circuit **12*a***, however, in the matrix of FIG. 3 the column circuits can be conveniently divided into two eight-group sets. Eight selection control circuits are needed for each set for a total of only sixteen selection control circuits to control the sixty-four column circuits. Additional steering diodes, bias sources, and resistors are also required, but it has been found that even with such additional elements the total hardware cost for the tandem matrix arrangement of FIG. 3 is less than the cost for a single matrix arrangement for matrices with more than four columns.

If a bipolar drive embodiment is desired, charge storage diodes are substituted for the diode 37 in each of the matrix crosspoint load circuits and for steering diodes 76. The initial part of matrix operation takes place as previously outlined; and, upon the termination of forward conduction, central control 16 closes a switch 101 to connect a source 102 to anode circuit 103. The resulting reverse current sweeps stored minority current carriers out of the crosspoint charge storage diode to provide the desired reverse current pulse in the load winding 36.

In FIG. 4 the primary matrix for selecting column circuits in the tandem matrix 10' has been separated out and is represented by the sets of rail circuits of a matrix 79. Considering the operation of the matrix arrangement briefly in terms of FIG. 4, and assuming the same selection of row rail 27 and column rail 30 in the matrix 10', selection control circuit **11*a* charges diode 18. At the same time, selection control circuits 12*a'* and 66 complete a charging current path to energize the charge storage diode 21 as indicated by the dot-dash arrows for the conducting path of the charging current $i_c$. This path extends from the control circuit 12*a'* through the diode 21 in the forward direction, then through its load circuit which includes the column rail 30 of matrix 10' and steering diode 62, back to the selection control circuit 66**. The charging path includes galvanic connections for coupling the primary and tandem matrices together. "Galvanic" is used here to distinguish other forms such as amplifier or transformer coupling.

After charging has been completed the common current control circuit 17'' closes a conduction path for the discharge current $i_d$, as indicated by broken line arrows in FIG. 4. The discharge path extends from source 43 through diode 18, rails 27 and 30 in matrix 10', diode 21 in the selected crosspoint of primary matrix 79, steering diode 76, and the common current control circuit 17''. The crosspoint load of matrix 10' is thereby energized. Other similar charge and discharge paths are provided by the crosspoint loads of the tandem matrix 79 and each of those loads includes a different rail circuit of the matrix 10'.

Although the present invention has been described in connection with particular embodiments thereof, it is to be understood that additional modifications and embodiments which will be obvious to those skilled in the art are included within the spirit and scope of the invention.

What is claimed is:

1. In an access switch matrix,
two sets of matrix rail circuits,
means interconnecting said sets of rail circuits and including a plurality of crosspoint circuits each interconnecting a different one of said rail circuits in one of said sets to only one rail circuit in the other of said sets,
each of said rail circuits including an asymmetrical conduction device connected in series therewith and poled for forward conduction in said rail circuit in a direction which is opposite to the direction of forward current in said rail circuit, and
means selectively forward biasing said asymmetrical conduction devices in one of said rail circuits of each of said sets.

2. The matrix in accordance with claim 1 in which
said asymmetrical conduction devices are charge storage diodes which store an electrical charge therein during forward conduction of the diode and from which said charge is removed by the subsequent application of a reverse current to the diode.

3. The matrix in accordance with claim 1 in which
a common control switch is connected in multiple to all of said rail circuits of one of said sets for applying current to a selected pair of said rail circuits and their interconnected crosspoint circuit in series,
said devices are charge storage diodes poled for conduction of said current from said common control switch in the reverse direction of said diodes, and
means control said forward biasing means to be operative at a predetermined time prior to each application of current from said common control switch.

4. The matrix in accordance with claim 1 which comprises in addition
means reversely biasing all of said devices for inhibiting forward conduction therein in the absence of bias from said forward biasing means.

5. The access switch matrix in accordance with claim 1 in which each of said crosspoint circuits includes a diode poled for the forward conduction of current in a direction which is opposite to the direction of forward conduction for said devices connected in rail circuits which are also connected to such crosspoint circuit.

6. The access switch matrix in accordance with claim 2 in which at least one of said crosspoint circuits includes a charge storage diode poled for the forward conduction of current in the opposite direction from the forward conduction direction for said devices in said rail circuits connected to such crosspoint circuit.

7. The access switch matrix in accordance with claim 6 in which means repetitively applying to said one rail circuit of each of said sets said forward current and said reverse current alternately.

8. The access switch matrix in accordance with claim 1 in which said forward biasing means comprises a first plurality of switches coupled to said rail circuits of at least one of said sets for applying current to said devices in such rail circuits in the device forward conduction direction, each of said switches applying forward current in multiple to a different group of said rail circuits in such set, and a second plurality of switches connected to receive said forward current from said first plurality of switches through corresponding ones of said rail circuits in said groups of said first set, a selected switch of each of said first and second pluralities of switches being simultaneously operable for forming a complete circuit through one of said rail circuits of said one set.

9. The access switch matrix in accordance with claim 1 in which said forward biasing means comprises a further access matrix having third and fourth sets of orthogonally arranged rail circuits interconnected at intersections thereof by crosspoint load circuits each having galvanically connected therein a rail circuit and its series-connected asymmetrical conduction device from one set of said rail circuits of the first-mentioned matrix, and control switch means selectably applying current to one rail circuit of each of said third and fourth sets of rail circuits for thereby energizing the further matrix crosspoint load defined thereby.

10. The access switch matrix in accordance with claim 1 in which said forward biasing means comprises a separate control switch connected to each of said devices in its respective rail circuit for applying current to a selected one of such devices in each of said sets.

11. The access matrix in accordance with claim 1 in which said devices are charge storage diodes, switch means control the application of said forward current to said crosspoint circuits, and said switch means comprising further charge storage diode means poled for forward conduction in the same direction as said devices.

12. The access matrix in accordance with claim 11 in which said crosspoint circuits require at least selectable first and second current amplitudes, said further charge storage diode means comprises at least a first and a second charge storage diode having different current carrier lifetimes which limit the amount of carriers that can be stored therein regardless of the duration of an applied forward current, the limit for each of such diodes corresponding to a different one of said first and second current amplitudes, means applying forward current to said first and second diodes, and means selectably applying said crosspoint circuit current through different ones of said first and second diodes for thereby selectably limiting such current to the corresponding carriers stored therein.

13. The access matrix in accordance with claim 1 in which switch means control the application of current to said devices in their forward conduction direction, and each of said switch means comprises a first amplifier and a second amplifier connected for tandem operation but having separate electrical ground connections.

References Cited

UNITED STATES PATENTS

| | | | |
|---|---|---|---|
| 2,734,184 | 2/1956 | Rajchman. | |
| 2,992,410 | 7/1961 | Groth et al. | |
| 3,164,810 | 1/1965 | Harding. | |
| 3,205,481 | 9/1965 | Corbella et al. | |
| 3,260,996 | 7/1966 | Muller. | |
| 3,334,332 | 8/1967 | Bobeck. | |
| 3,349,186 | 10/1967 | Bereznak | 340—166 XR |

DONALD J. YUSKO, Primary Examiner